(12) United States Patent
Lam

(10) Patent No.: US 7,086,039 B2
(45) Date of Patent: Aug. 1, 2006

(54) COMPILER FOR OPTIMIZING SOURCE CODE WITH COMPUTED GOTO STATEMENTS

(75) Inventor: Michael Shungkai Lam, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 632 days.

(21) Appl. No.: 10/293,457

(22) Filed: Nov. 13, 2002

(65) Prior Publication Data

US 2004/0093590 A1    May 13, 2004

(51) Int. Cl.
*G06F 9/44* (2006.01)
(52) U.S. Cl. ...................................................... 717/136
(58) Field of Classification Search ............... 717/136, 717/151, 152
See application file for complete search history.

(56) References Cited

U.S. PATENT DOCUMENTS

| | | | | |
|---|---|---|---|---|
| 4,667,290 A | * | 5/1987 | Goss et al. ................ | 717/147 |
| 5,857,105 A | | 1/1999 | Ayers et al. ................ | 395/708 |
| 6,161,219 A | * | 12/2000 | Ramkumar et al. ......... | 717/130 |
| 6,412,105 B1 | * | 6/2002 | Maslennikov et al. ...... | 717/151 |
| 6,662,354 B1 | * | 12/2003 | Krablin et al. .............. | 717/140 |

OTHER PUBLICATIONS

"Static slicing in the presence of goto statements", Jong-Deok Choi, Jeanne Ferrante, Jul. 1994, ACM Transactions on Programming Languages and Systems (TOPLAS), vol. 16 Issue 4, pp. 1097-1113.*

"Practical parsing patterns: ASTs for optimizing compilers", Sep. 2001, ACM SIGPLAN Notices, vol. 36 Issue 9, pp. 25-30.*

"A case study of a new code generation technique for compilers", J. Lawrence Carter, Dec. 1977, Communications of the ACM, vol. 20 Issue 12, pp. 914-920.*

Sturat I. Feldman, "Implementation of a Portable Fortran 77 Compiler Using Modern Tools", Aug. 1979, Proceedings of the 1979 SIGPLAN symposium on Compiler construction SIGPLAN, pp. 98-106.*

* cited by examiner

*Primary Examiner*—Wei Zhen
*Assistant Examiner*—Philip Wang
(74) *Attorney, Agent, or Firm*—Park, Vaughan & Fleming LLP

(57) ABSTRACT

A method of translating computer source code into optimized object code. The computer source code contains a first label statement defining a first label, a second label statement defining a second label, a third label statement defining a third label, and a computed goto statement for instructing a computer to branch to the first label or to the second label, but not to the third label. The method includes generating a list of labels contained within at least a portion of the computer source code. The list of labels includes the first label and the second label, but not the third label. The method also includes translating the computer source code into an intermediate language. The translation of the computer source code includes translating the computed goto statement into an indirect goto statement within the intermediate language. The method also includes generating object code that includes the first label and the second label but does not include the third label.

19 Claims, 4 Drawing Sheets

Figure 4:
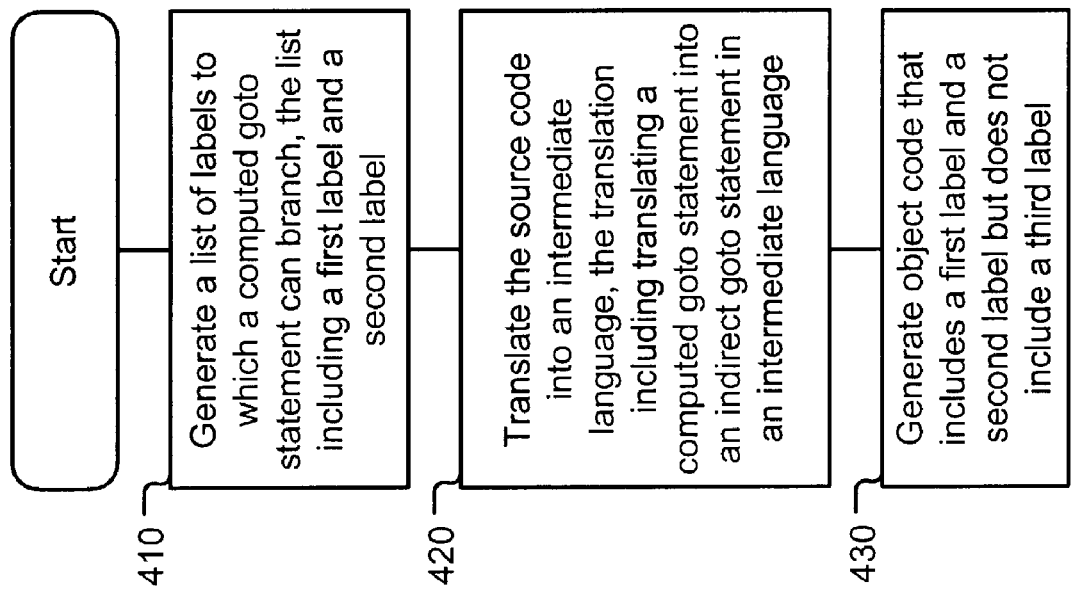

| | Source Code | Intermediate Language |
|---|---|---|
| 1: | main(); | |
| 2: | { | |
| 3: |     void *ptr; | |
| 4: |     ptr = &&label1; | |
| 5: |     ... | |
| 6: |     if ( . . . ) ptr = &&label2; | |
| 7: |     ... | |
| 8: |     goto *ptr; | IR_INDIRECT_GOTO (label1, label2) |
| 9: | label1: | IR_LABEL_DEF 1 |
| 10: |     ... | |
| 11: | label2: | IR_LABEL_DEF 2 |
| 12: |     ... | |
| 13: |     goto label4; | IR_GOTO label4 |
| 14: |     goto label3; | IR_GOTO label3 |
| 15: |     ... | |
| 16: | label4: | IR_LABEL_DEF 3 |
| 17: |     ... | |
| 18: | label3: | IR_LABEL_DEF 4 |
| 19: |     printf("End of program."); | |
| 20: | } | |

```
1:  main()
2:  {
3:      ...
4:      goto label1;
5:      goto label2;
6:  label1:
7:      ...
8:  label2:
9:      ...
10:     printf("End of program.");
11: }
```

*Figure 1*

```
1:  main()
2:  {
3:      ...
4:      goto label1;
5:      ...
6:  label1:
7:      ...
8:      printf("End of program.");
9:  }
```

*Figure 2*

```
1:  main();
2:  {
3:      void  *ptr;
4:      ptr = &&label3;
5:      ...
6:      if (...) ptr = &&label4;
7:      ...
8:      goto *ptr;
9:  label3:
10:     ...
11: label4:
12:     ...
13:     goto label1;
14:     goto label2;
15:     ...
16: label1:
17:     ...
18: label2:
19:     printf("End of program.");
20: }
```

*Figure 3*

```
1:  main();
2:  {
3:      void  *ptr;
4:      ptr = &&label1;
5:      ...
6:      if ( ... ) ptr = &&label2;
7:      ...
8:      goto *ptr;
9:  label1:
10:     ...
11: label2:
12:     ...
13:     goto label4;
14:     goto label3;
15:     ...
16: label4:
17:     ...
18: label3:
19:     printf("End of program.");
20: }
```

*Figure 5*

| Source Code | Intermediate Language |
|---|---|
| 1: main(); | |
| 2: { | |
| 3:   void *ptr; | |
| 4:   ptr = &&label1; | |
| 5:   ... | |
| 6:   if (....) ptr = &&label2; | |
| 7:   ... | |
| 8:   goto *ptr; | IR_INDIRECT_GOTO (label1, label2) |
| 9: label1: | IR_LABEL_DEF 1 |
| 10:   ... | |
| 11: label2: | IR_LABEL_DEF 2 |
| 12:   ... | |
| 13:   goto label4; | IR_GOTO label4 |
| 14:   goto label3; | IR_GOTO label3 |
| 15:   ... | |
| 16: label4: | IR_LABEL_DEF 3 |
| 17:   ... | |
| 18: label3: | IR_LABEL_DEF 4 |
| 19:   printf("End of program."); | |
| 20: } | |

*Figure 6*

COMPILER FOR OPTIMIZING SOURCE CODE WITH COMPUTED GOTO STATEMENTS

1. FIELD OF THE INVENTION

The present invention generally relates to a source code compiler. More specifically, the present invention relates to a source code compiler that can compile source code with computed goto statements into optimized object code.

2. BACKGROUND

A compiler translates human-readable source code into machine-readable object code. For example, a compiler may be utilized to translate the source code shown in FIG. 1 into object code. Line 1 of FIG. 1 defines a "main" procedure. The procedure includes instructions located between the forward bracket in line 2 and the reverse bracket on line 11. Line 7 of FIG. 1 contains a label statement that defines "label1." Similarly, line 9 contains a label statement that defines "label2." Line 4 of FIG. 1 contains a "goto" statement for commanding a computer to branch to "label1," i.e., line 7. Similarly, line 5 of the source code contains a goto statement for commanding the computer to branch to "label2" i.e., line 9. Finally, line 10 contains a "printf" statement for commanding a computer to print the phrase "End of program." Lines 3, 6 and 8 of FIG. 1 contain other source code statements that are not shown.

In addition to generating object code, some compilers, known as optimizing compilers, optimize the object code so that a computer can store and execute the object code more efficiently. For example, an optimizing compiler may increase the efficiency of object code by analyzing program flow. As a result of a program flow analysis, an optimizing compiler could determine that the program flow of the source code in FIG. 1 would always bypass the "goto label2" statement in line 5. Thus, that statement, as well as the "label2" statement in line 9, could be eliminated. As a result, the optimizing compiler could optimize the generated object code to have a structure as shown in FIG. 2. Such object code would be smaller than and would be executed faster than non-optimized object code.

One type of statement utilized in some computer programs is a computed goto statement. Computed goto statements are useful to command a computer to branch to one of several labels based upon program logic. As a result, computed goto statements enable a high degree of branching flexibility. For example, a programmer can use computed goto statements to allow runtime information to determine branching destinations. More specifically, a programmer could store the address of a program label (a branch destination) in a variable and then utilize a computed goto statement to branch to the value stored in the variable. Additional information on computed goto statements can be found at: http://gcc.gnu.org/onlinedocs/gcc-3.2/gcc/Labels-as-Values.html#Labels%20as%20Values.

An example of a computer program using a computed goto statement is shown in FIG. 3. Line 3 of FIG. 3 defines a pointer to variable "ptr." Line 4 assigns, using the unary operator &&, the address of the label "label3" to "ptr." FIG. 3 contains a similar statement in line 6 that conditionally assigns the address of the label "label4" to "ptr." Thus, under some, but not all circumstances, line 6 of FIG. 3 will reassign "ptr." Line 8 contains a computed goto statement for commanding a computer to branch to the address currently stored within "ptr." The address to which the computer branches depends upon whether the conditional assignment in line 6 reassigns "ptr." If "ptr" is reassigned, then the computer branches to line 11. However, if "ptr" is not reassigned, then the computer branches to line 9.

The use of computed goto statements makes some optimizations difficult for a compiler. As a result of the existence of the computed goto statement, a conventional compiler may not be able to optimize object code by eliminating the "goto label2" statement in line 14 and the label "label2" in line 18 of FIG. 3. Thus, a need exists for a compiler that can translate source code that contains computed goto statements into optimized object code.

3. SUMMARY OF INVENTION

One embodiment of the invention is a method of translating computer source code into optimized object code. The computer source code contains a first label statement defining a first label, a second label statement defining a second label, a third label statement defining a third label, and a computed goto statement for instructing a computer to branch to the first label or to the second label, but not to the third label. The method includes generating a list of labels contained within at least a portion of the computer source code. The list of labels includes the first label and the second label, but not the third label. The method also includes translating the computer source code into an intermediate language. The translation of the computer source code includes translating the computed goto statement into an indirect goto statement within the intermediate language. The method also includes generating object code that includes the first label and the second label but does not include the third label.

Another embodiment of the invention is another method of translating the above computer source code into optimized object code. The method includes generating a list of labels contained within at least a portion of the computer source code. The list of labels includes the first label and the second label, but not the third label. The method also includes translating the computer source code into object code that includes the first label and the second label but does not include the third label.

4. BRIEF DESCRIPTION OF THE FIGURES

FIG. 1 presents an example of computer source code that contains an unnecessary goto statement and an unnecessary label statement.

FIG. 2 presents an example of an optimized version of the computer source code of FIG. 1.

FIG. 3 presents an example of computer source code that includes a computed goto statement, an unnecessary goto statement and an unnecessary label statement.

FIG. 4 presents a method of optimizing the computer source code of FIG. 3 and FIG. 5.

FIG. 5 presents another example of computer source code that includes a computed goto statement, an unnecessary goto statement and an unnecessary label statement.

FIG. 6 presents a partial translation of the computer source code of FIG. 5 into an intermediate language.

5. DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

One embodiment of the invention is a method, performed by a computer, of translating computer source code into optimized object code. A flow chart of the method is shown in FIG. 4. The method of FIG. 4 may be utilized to convert the computer source code shown in FIG. 5 into optimized object code.

The source code shown in FIG. 5 contains a first label statement in line 9. This statement defines "label1." Line 11 of the source code also includes a second label statement that defines "label2." In addition, the source code includes a computed goto statement in line 8. The computed goto statement instructs a computer to branch to either "label1" or "label2" depending upon the value of "ptr." If "ptr" is reassigned to "label2" in line 6, then the computed goto will instruct a computer to branch to "label2," i.e., line 11. Otherwise, the computed goto will instruct the computer to branch to "label1," i.e., line 9.

The source code of FIG. 5 also contains two other label statements. Line 16 defines "label4" and line 18 defines "label3." Note, however, that the computed goto statement in line 8 cannot branch to either "label3" at line 18 or "label4" at line 16 because the computer source code does not include any assignments of "ptr" to the address of either "label3" or "label4."

5.1 Generating a List of Labels

Referring to block 410 of FIG. 4, one step in the method of translating the source code into object code includes generating a list of labels to which a computed goto statement can branch. For example, the source code of FIG. 5 contains four labels: "label1," "label2," "label3," and "label4." However, only labels "label1" and "label2" can be branched to as a result of the computed goto statement in line 8. Thus, the list of labels for the source code of FIG. 5 would include only "label1" and "label2."

In some embodiments of the invention, the list of labels to which a computed goto can branch is generated before source code is translated into an intermediate language. (See Section 5.2 for a description of source code translation.) In other embodiments of the invention, the list of labels is generated during the source code translation. In still other embodiments of the invention, the list of labels is generated after the source code has been translated into an intermediate language.

In some embodiments of the invention, the list of labels could be stored in a linked-list by the front-end of a compiler. However, in other embodiments of the invention, the list of labels is stored in other data structures such as arrays or even in files stored on disk drives.

5.2 Translating Source Code into an Intermediate Language

As shown in Block 420 of FIG. 4, in some embodiments of the invention, the front-end of the compiler translates the source code into an intermediate language, such as an intermediate representation ("IR") language. For example, the source code of FIG. 5 may be translated into an intermediate language as shown in FIG. 6.

As shown in FIG. 6, the computed goto statement "goto *ptr" in line 8 of the source code is translated into an indirect goto statement in the intermediate language. In some embodiments of the invention, the resulting indirect goto statement includes a reference to the complete list of labels to which the computed goto statement can branch. In other embodiments of the invention, as discussed in Section 5.4 below, the indirect goto statement may include a reference to an empty list or an incomplete list of labels to which the computed goto statement can branch. (As discussed in Section 5.4 below, the empty or incomplete list is later supplemented.)

Returning again to FIG. 6, the label statements in lines 9, 11, 16, and 18 of the source code are converted into intermediate language label definition statements. Similarly, the goto statements in lines 13 and 14 of the source code are converted into intermediate language goto statements. (The conversion of other statements in the source code to the intermediate language is not shown in FIG. 6 to avoid obscuring the invention.)

5.3 Generating Object Code

As shown in Block 430 of FIG. 4, some embodiments of invention convert the intermediate language into object code. The conversion into object code can be accomplished in many ways. For example, the front-end of a compiler could pass the intermediate language to the back-end of the compiler. The back end of the compiler could then read the intermediate language and begin optimization processes, such as the elimination of unnecessary and/or unused labels.

In some embodiments of the invention, when the backend of the compiler reads the intermediate language, it would read the indirect goto statement discussed in Section 5.2. As discussed above, the indirect goto statement would include a list of labels to which the indirect goto statement could branch. When the back-end of the compiler attempts to eliminate labels, it would not eliminate any labels included in the list of labels because such labels may be branched to under certain circumstances. However, the backend of the compiler could eliminate any unneeded or unused labels that are not included in the list of labels. For example, the back-end of the compiler could perform a program flow analysis of the intermediate language and could eliminate the intermediate language statement that corresponds to "goto label3" in line 14 of the source code shown in FIG. 6. Similarly, the back-end of the compiler could eliminate the intermediate label definition statement that corresponds to the "label3" definition in line 18 of FIG. 6.

The resulting object code would include "label1" and "label2" because those labels may be branched to under certain circumstances. Similarly, the resulting object code would include "label4" because a goto statement utilizes that label. However, the resulting object code would not include "label3" because that label is not needed.

5.4 Back-Patching Labels

In some embodiments of the invention, the list of labels is generated concurrently with the sequential translation of the source code into the intermediate language. In such cases, when the front-end of a compiler translates a computed goto statement into an intermediate language indirect goto statement, the complete list of labels may not be known. For example, an address of a label may be assigned to "ptr" after the computed goto statement. In such cases, it is not possible to generate an intermediate language indirect goto statement that references the complete list of labels to which the indirect goto statement could branch.

Thus, in some embodiments of the invention, when the complete list of labels for a computed goto statement is not known during a translation of the computed goto statement, the computed goto statement is translated into an intermediate language indirect goto statement that includes a reference to an empty or a partial list of labels. As the front-end of the compiler continues sequentially translating the source code into the intermediate language, the compiler supplements the list of labels as additional labels to which the indirect goto statement could branch are encountered. This technique will be referred to as back-patching labels.

In some embodiments of the invention, the supplementation of the list of labels occurs when the compiler encounters an assignment of the address of a label to a variable, such as "ptr." However, in other embodiments of the invention, the supplementation occurs at the conclusion of the translation of an entire program or program module into the intermediate language.

5.5 Conclusion

The foregoing descriptions of embodiments of the present invention have been presented for purposes of illustration and description only. They are not intended to be exhaustive or to limit the present invention to the forms disclosed. For example, the inventive methods could be accomplished without translating source code into an intermediate language. Instead, such source code could be translated directly into object code. Accordingly, many modifications and variations will be apparent to practitioners skilled in the art. One variation includes program storage devices, such as CDROMs, DVDs, floppy disks, and/or hard disks, containing computer-readable instructions, that when executed by a computer, perform portions of the above-described methods. Still other variations of the invention include a computer program that contains object code generated by portions of the above-described methods. Additionally, the above disclosure is not intended to limit the present invention. The scope of the present invention is defined by the appended claims.

It is claimed:

1. A method, performed by a computer, of translating computer source code into optimized object code, the computer source code containing a first label statement defining a first label, a second label statement defining a second label, and a third label statement defining a third label, the first label, the second label and the third label not being case labels, the computer source code also containing a computed goto statement for instructing a computer to branch to the first label or to the second label, but not to the third label, the method comprising:
    a) generating a list of labels contained within at least a portion of the computer source code, the list of labels including the first label and the second label, but not the third label;
    b) translating the computer source code into an intermediate language, the act of translating the computer source code including translating the computed goto statement into an indirect goto statement within the intermediate language; and
    c) generating object code that includes the first label and the second label but does not include the third label.

2. The method of claim 1, wherein the list of labels is generated before the computer source code is translated into the intermediate language.

3. The method of claim 1, wherein the list of labels is generated concurrently with the translation of the computer source code into the intermediate language.

4. The method of claim 1, wherein the list of labels is generated after the computer source code is translated into the intermediate language.

5. The method of claim 1, wherein generating the list of labels includes generating a list of labels that includes all labels to which the computed goto statement can branch.

6. The method of claim 1, wherein generating the list of labels includes generating a linked-list.

7. The method of claim 1, wherein a compiler front-end generates the list of labels.

8. The method of claim 1, wherein a compiler back-end generates the object source code.

9. The method of claim 1, wherein the translation of the computer source code into the intermediate language includes translating the computed goto statement into an intermediate language indirect goto statement that refers to a complete list of labels to which the indirect goto statement can branch.

10. The method of claim 1, wherein the translation of the computer source code into the intermediate language includes translating the computed goto statement into an intermediate language indirect goto statement that refers to an partial list of labels to which the indirect goto statement can branch.

11. The method of claim 1, wherein the translation of the computer source code into the intermediate language includes translating the computed goto statement into an intermediate language indirect goto statement that refers to an empty list of labels.

12. A method, performed by a computer, of translating computer source code into optimized object code, the computer source code containing a first label statement defining a first label, a second label statement defining a second label, and a third label statement defining a third label, the first label, the second label and the third label not being case labels, the computer source code also containing a computed goto statement for instructing a computer to branch to the first label or to the second label, but not to the third label, the method comprising:
    a) generating a list of labels contained within at least a portion of the computer source code, the list of labels including the first label and the second label, but not the third label;
    b) translating the computer source code into object code that includes the first label and the second label but does not include the third label.

13. The method of claim 12, wherein the list of labels is generated before the computer source code is translated into object code.

14. The method of claim 12, wherein the list of labels is generated concurrently with the translation of the computer source code into object code.

15. A program storage device containing computer readable instructions that when executed by a computer performs a method of translating computer source code into optimized object code, the computer source code containing a first label statement defining a first label, a second label statement defining a second label, and a third label statement defining a third label, the first label, the second label and the third label not being case labels, the computer source code also containing a computed goto statement for instructing a computer to branch to the first label or to the second label, but not to the third label, the method comprising:
    a) generating a list of labels contained within at least a portion of the computer source code, the list of labels including the first label and the second label, but not the third label;
    b) translating the computer source code into an intermediate language, the act of translating the computer source code including translating the computed goto statement into an indirect goto statement within the intermediate language; and c) generating object code that includes the first label and the second label but does not include the third label.

16. The program storage device of claim 15, further containing instructions for generating the list of labels before the computer source code is translated into the intermediate language.

17. The program storage device of claim 15, further containing instructions for generating the list of labels concurrently with the translation of the computer source code into the intermediate language.

18. The program storage device of claim 15, further containing instructions for generating the list of labels after the computer source code is translated into the intermediate language.

19. A computer program stored in computer storage media that is generated by performing a method of translating computer source code into optimized object code, the computer source code containing a first label statement defining a first label, a second label statement defining a second label, a third label statement defining a third label, the first label, the second label and the third label not being case labels, the computer source code also containing a computed goto statement for instructing a computer to branch to the first label or to the second label, but not to the third label, the method comprising the following acts, which are performed by a computer system:

a) generating a list of labels contained within at least a portion of the computer source code, the list of labels including the first label and the second label, but not the third label;

b) translating the computer source code into an intermediate language, the act of translating the computer source code including translating the computed goto statement into an indirect goto statement within the intermediate language; and c) generating object code that includes the first label and the second label but does not include the third label.

* * * * *